Nov. 22, 1927.            J. BOIARSKY            1,649,803
                          PASTRY CUTTER
                        Filed Jan. 10, 1927
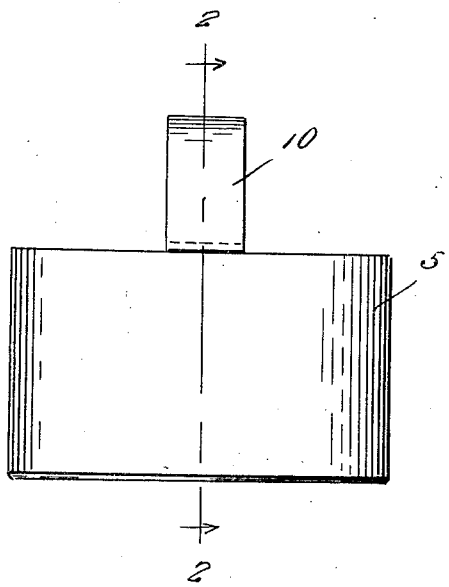
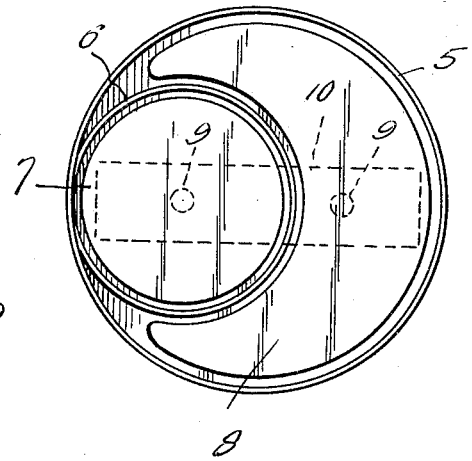
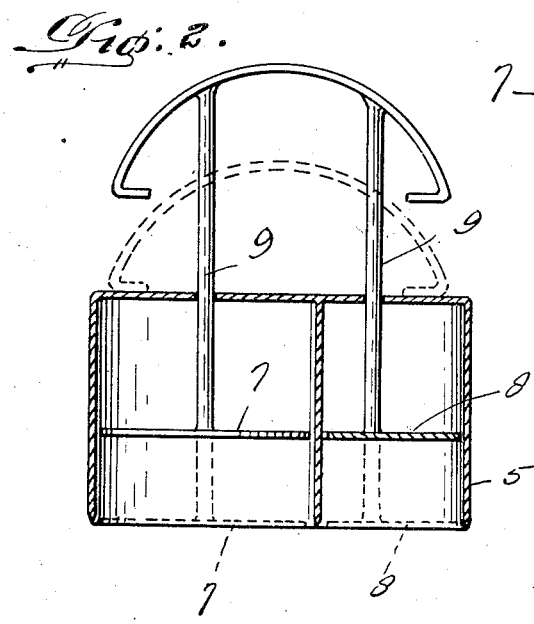
Inventor
Jennie Boiarsky,
By Clarence A. O'Brien
           Attorney.

Patented Nov. 22, 1927.

1,649,803

UNITED STATES PATENT OFFICE.

JENNIE BOIARSKY, OF CHARLESTON, WEST VIRGINIA.

PASTRY CUTTER.

Application filed January 10, 1927. Serial No. 160,214.

This invention relates to new and useful improvements in cutters for biscuits, cookies, and other pastry, and has for its primary object to provide a cutter of this character wherein a plurality of different shaped biscuits, cookies, and the like are cut at a single operation of the cutter.

A further and important object resides in the provision of means whereby the cut dough may be readily projected from the cutter without breaking the dough and to permit a proper disposition within a bake pan.

A further and important object resides in the provision of a cutter of this character that is extremely simple of construction, inexpensive of manufacture, and extremely well adapted for all the purposes intended.

With the forgoing and other objects in view as the nature of the invention will be better understood, the same comprises the novel form, combination and arrangement of parts hereinafter more fully described, shown in the accompanying drawing and claimed.

In the drawing wherein like numerals indicate like parts throughout the several views:

Figure 1 is a side elevation of a pastry cutter constructed in accordance with the present invention.

Figure 2 is a detail vertical section taken substantially upon the line 2—2 of Figure 1, and Figure 3 is a bottom plan view of the cutter.

Now having particular reference to the drawing my novel cutter consists of a cylindrical shell 5 of suitable depth and width, the same being open at its bottom side as clearly disclosed in Figures 2 and 3, the lower edge of said shell being sharpened to facilitate the cutting through the dough. Arranged eccentrically within the shell 5 and in contact with the interior surface thereof is a smaller shell 6 preferably formed integrally with the main shell 5 as indicated in Figures 2 and 3. Obviously the space within the main shell 5 around the secondary shell 6 is of crescent shape in plan, and obviously when the cutter is inserted into the dough a circular and crescent shape batch of the biscuit or pastry material will be formed.

Freely slidable within the secondary shell 6 is a circular disc 7, while mounted for sliding movement within the main shell 5 around said secondary shell 6 is a crescent-shaped plate 8, said disc and said plate being carried by vertical pins 9—9 that slide through openings in the top wall of the shell 5, and that are connected at their outer ends by a semi-circular shaped handle piece 10.

Obviously during the cutting operation, portions of the dough will enter the secondary shell 6 and the main shell 5 surrounding said shell resulting in the formation of circular and crescent-shaped biscuits or pastries. By forcing downwardly upon the handle 10, the cut dough is ejected from the main and secondary shells by reason of the plate 8 and disc 7 coming into contact therewith as suggested by the dotted lines in Figure 2.

In view of the foregoing specification when considered in conjunction with the accompanying drawings it will at once be apparent that I have provided a highly novel, simple, and efficient pastry cutter that is well adapted for all the purposes hertofore designated, even though I have herein shown and described the invention as consisting of certain detail structural elements, it is nevertheless to be understood that minor changes may be made therein without affecting the spirit and scope of the appended claims.

Having thus described the invention, what I claim is:—

1. In a pastry cutter of the class described, an open bottomed shell of circular configuration, a relatively small similarly shaped shell arranged eccentrically within the main shell and contacting with the inner face of the larger shell for providing a substantially crescent shaped space within the main shell, the lower edges of the shell being sharpened for the purpose of cutting two different designs of pastry blanks, a circular shaped ejector member slidable within the smaller circular shell, a substantially crescent shaped ejector member slidable within the crescent shaped space formed in the main shell whereby the cut dough may be discharged from the shells, rods extending upwardly from the ejector members through the top of the main shell, and a handle bridging the upper ends of the rods for actuating the ejector members simultaneously said handle having stop means for limiting the downward movement of the ejector.

2. In a pastry cutter, an open bottomed shell, means dividing the shell into a pair of compartments, ejector members slidable within the compartments, rods extending upwardly from the ejector members through the top of the shell, and an arcuate handle having intermediate portions thereof fixed to the upper ends of said rods, the convex side of the handle being disposed upwardly, the ends of the handle terminating in inwardly directed extensions adapted to abut the top of the shell when the handle is pushed downwardly to move the ejectors to the bottom end of the shell.

In testimony whereof I affix my signature.

JENNIE BOIARSKY.